(12) United States Patent
Li et al.

(10) Patent No.: US 9,218,064 B1
(45) Date of Patent: Dec. 22, 2015

(54) AUTHORING MULTI-FINGER INTERACTIONS THROUGH DEMONSTRATION AND COMPOSITION

(71) Applicant: Google Inc., Mountain View, CA (US)

(72) Inventors: Yang Li, Palo Alto, CA (US); Hao Lu, Seattle, WA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 13/791,830

(22) Filed: Mar. 8, 2013

Related U.S. Application Data (60) Provisional application No. 61/702,735, filed on Sep. 18, 2012.

(51) Int. Cl.
*G06F 3/01* (2006.01)

(52) U.S. Cl.
CPC ...................................... *G06F 3/017* (2013.01)

(58) Field of Classification Search
None
See application file for complete search history.

(56) References Cited

U.S. PATENT DOCUMENTS

| | | | | |
|---|---|---|---|---|
| 6,249,606 | B1* | 6/2001 | Kiraly et al. ................... | 382/195 |
| 6,304,674 | B1* | 10/2001 | Cass ....................... | G06K 9/222 382/103 |
| 6,389,586 | B1* | 5/2002 | McElvain ...................... | 716/111 |
| 6,505,342 | B1* | 1/2003 | Hartmann et al. ............. | 717/104 |
| 7,000,200 | B1* | 2/2006 | Martins .......................... | 715/863 |
| 8,436,821 | B1* | 5/2013 | Plichta et al. .................. | 345/173 |
| 2001/0036356 | A1* | 11/2001 | Weaver et al. .................... | 386/52 |
| 2003/0046658 | A1* | 3/2003 | Raghavan et al. ............ | 717/106 |
| 2003/0055644 | A1* | 3/2003 | Johnston et al. ............... | 704/251 |
| 2005/0210417 | A1* | 9/2005 | Marvit et al. .................. | 715/863 |
| 2006/0224924 | A1* | 10/2006 | Grieskamp et al. ............. | 714/38 |
| 2006/0235548 | A1* | 10/2006 | Gaudette .......................... | 700/83 |
| 2006/0235696 | A1* | 10/2006 | Bennett ....................... | 704/270.1 |
| 2007/0177803 | A1* | 8/2007 | Elias et al. ..................... | 382/188 |
| 2008/0163130 | A1* | 7/2008 | Westerman .................... | 715/863 |
| 2009/0006292 | A1* | 1/2009 | Block .............................. | 706/20 |
| 2009/0178011 | A1* | 7/2009 | Ording et al. ................. | 715/863 |
| 2010/0005203 | A1* | 1/2010 | Lambov ......................... | 710/100 |
| 2010/0031202 | A1* | 2/2010 | Morris et al. ................. | 715/863 |
| 2010/0281385 | A1* | 11/2010 | Meaney et al. ................ | 715/731 |
| 2011/0066984 | A1* | 3/2011 | Li ........................ | G06F 3/04883 715/863 |
| 2011/0103772 | A1* | 5/2011 | Suzuki .......................... | 386/285 |
| 2011/0164032 | A1* | 7/2011 | Shadmi ......................... | 345/419 |
| 2012/0131513 | A1* | 5/2012 | Ansell ............................ | 715/863 |
| 2012/0225719 | A1* | 9/2012 | Nowozin et al. ................ | 463/36 |
| 2013/0141375 | A1* | 6/2013 | Ludwig et al. ................ | 345/173 |

OTHER PUBLICATIONS

Hartmann et al., "Authoring Sensor-based Interactions by Demonstration with Direct Manipulation and Pattern Recognition," 2007, Proceedings of the SIGCHI Conference on Human Factors in Computing Systems, pp. 145-154, pp. 145-154, http://dl.acm.org/citation.cfm?id=1240646.*

(Continued)

*Primary Examiner* — Ryan Barrett
(74) *Attorney, Agent, or Firm* — Shumaker & Sieffert, P.A.

(57) ABSTRACT

A computing device comprises a processor and an authoring tool executing on the processor. The processor receives demonstration data representative of at least one demonstration of a multi-finger gesture and declaration data specifying one or more constraints for the multi-finger gesture. The processor generates, in accordance with the demonstration data and the declaration data, a module to detect the multi-finger gesture within a computer-generated user interface.

19 Claims, 7 Drawing Sheets

(56) References Cited

OTHER PUBLICATIONS

Dey et al., "a CAPpella: Programming by Demonstration of Context-Aware Applications," 2004, Proceedings of the SIGCHI Conference on Human Factors in Computing Systems, pp. 33-40, http://dl.acm.org/citation.cfm?id=985697.*

Wright, "Finite State Machines," 2005, http://www4.ncsu.edu/~drwrigh3/docs/courses/csc216/fsm-notes.pdf.*

Cryan, "Probabilistic Finite State Machines and Hidden Markov Models," Nov. 2004, http://www.inf.ed.ac.uk/teaching/courses/inf1/cl/notes/Comp7.pdf.*

Ashbrook et al., "MAGIC: A Motion Gesture Design Tool," Apr. 10-15, 2010, Proceedings of the SIGCHI Conference on Human Factors in Computing Systems, pp. 2159-2168, http://dl.acm.org/citation.cfm?id=1753653.*

Rubine, "The Automatic Recognition of Gestures," CMU-CS-91-202, Dec. 1991, Submitted in partial fulfillment of the requirements for the degree of Doctor of Philosophy in Computer Science at Carnegie Mellon University, 284 pp.

Lu et al., "Gesture Coder: A Tool for Programming Multi-Touch Gestures by Demonstration," CHI '12, May 5-10, 2012, 10 pp.

Rubine, "Specifying Gestures by Example," Computer Graphics, vol. 25, No. 4, Jul. 1991, pp. 329-337.

* cited by examiner

AUTHORING MULTI-FINGER INTERACTIONS THROUGH DEMONSTRATION AND COMPOSITION

This application claims the benefit of U.S. Provisional Application 61/702,735, filed Sep. 18, 2012, the entire content of which is hereby incorporated by reference.

BACKGROUND

Multi-finger interaction, enabled by many modern computing devices, has changed the manner in which users interact with such computing devices. With multi-finger interaction, a computing device including or operatively coupled to a presence-sensitive device can detect multiple concurrent inputs (e.g., multiple finger inputs) and, in response, modify a graphical user interface output by the computing device for display at a display device. Such support for multiple, concurrent inputs enables a computing device to provide an intuitive, expressive, and dynamic user interface.

However, the richness and intuitiveness of this multi-finger interaction often comes at the cost of increased complexity for developers, who must specify how applications should respond to the multiple concurrent inputs described above. Because event models based on a user interface capable of transitions between multiple fingers and their simultaneous movements are complex, it can be difficult for developers to program, test, and deploy applications supporting this powerful functionality.

SUMMARY

In one example, a method comprises receiving, at a processor of a computing device, demonstration data representative of a demonstration of a multi-finger gesture and declaration data specifying one or more constraints associated with the multi-finger gesture. The method further comprises generating, by the processor and in accordance with the demonstration data and the declaration data, a module configured to detect the multi-finger gesture within a computer-generated user interface.

In another example, a computing device comprises a processor and an authoring tool executing on the processor. The processor receives demonstration data representative of at least one demonstration of a multi-finger gesture and declaration data specifying one or more constraints for the multi-finger gesture. The processor generates, in accordance with the demonstration data and the declaration data, a module to detect the multi-finger gesture within a computer-generated user interface.

In another example, a computer-readable storage medium comprising instructions to cause a processor to receive demonstration data representative of a demonstration of a multi-finger gesture declaration data specifying one or more constraints associated with the multi-finger gesture. The instructions further cause the processor to generate, in accordance with the demonstration data and the declaration data, a module to support the multi-finger gesture within a user interface of a computing device.

The details of one or more examples of the disclosure are set forth in the accompanying drawings and the description below. Other features, objects, and advantages will be apparent from the description and drawings, and from the claims.

DETAILED DESCRIPTION

In general, this disclosure describes techniques that may allow developers to more easily specify complex behaviors for interacting with computing devices. In one example, a computer system executes tools that constructs and outputs a user interface with which developers can define requirements for multi-finger gestures. For example, a multi-finger gesture authoring tool may enable developers to, by way of interaction with the user interface, demonstrate the multi-finger touch gestures, compose complicated behaviors, test these behaviors in the tool and export source code that can be integrated into the developers' software project. In some implementations, such a tool may construct and output the user interface in accordance with a video-authoring metaphor in which multi-finger gestures are represented and manipulated, in response to input from the developers, as video clips. Although described for purpose of example with respect to touch-based interfaces, tools described herein may readily be applied to any interface in which a presence-sensitive display is responsive to gestures by the user. Aspects of this disclosure may be particularly useful for specifying interactions to be supported by a user interface of a mobile computing device that supports a presence-sensitive display, such as touch-sensitive display.

As described herein, an example implementation of a multi-finger gesture authoring tool can operate in a manner that combines the strengths of both programming by demonstration and programming by declaration. For example, in some implementations, such the tool may enable programming by demonstration, in which the tool enables a developer to physically demonstrate individual gestures by way of example. That is, in such implementations, the tool is configured to support programming by demonstration in which a developer creates target interaction behaviors by directly demonstrating them on a presence-sensitive device. In this scenario, the tool may operate to automatically construct state machines and control logic to detect the gestures demonstrated by the programmer.

Moreover, implementations of the tool may integrate declaration-based features that allow developers to explicitly specify high-level behaviors by composing complex gestures using a video-authoring-based interface. For example, implementations of the tool may present a user interface by which a developer may assemble demonstrated gestures on a timeline to define a complex gesture in a manner that is analogous to composing a video from multiple video clips. Further, in some examples, the tool may, in response to input from the user manipulating the video clips, define temporal constraints for the gesture, and may enable the developer to specify and attach particular software callback actions to the gesture at various points along the timeline. In this way, examples of the multi-finger gesture authoring tool described herein may unify both demonstration and declaration as mechanisms for defining multi-finger gestures. The tool may, in accordance with demonstration data and declaration data, generate one or more modules can be used in own applications to provide user interface support for the newly defined gestures. The modules may be software source code, firmware, logic definitions (e.g., VHDL) for hardware components or other modules configured to detect a newly defined multi-finger gesture.

Figure 1:
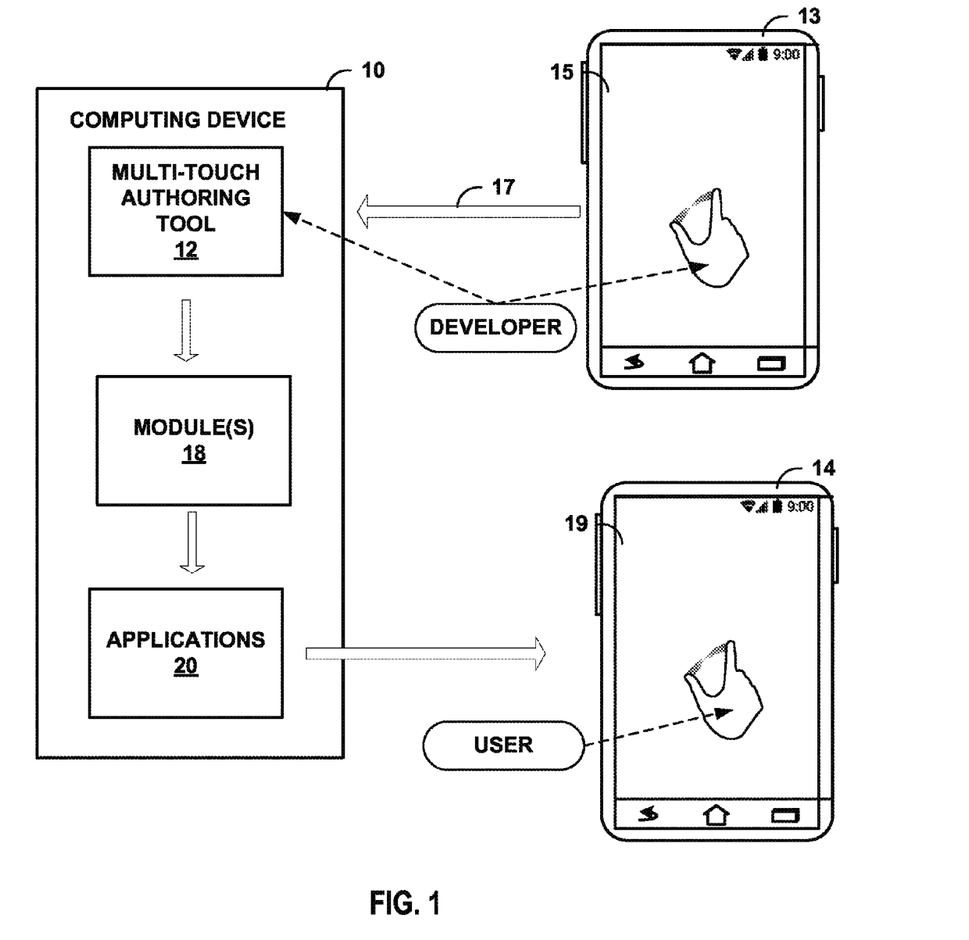
FIG. 1 is a block diagram illustrating an example environment in which a multi-finger gesture authoring tool executes on a computing device in accordance with one or more aspects of the present disclosure.

FIG. 1 is a block diagram illustrating an example computing device 10 that provides an execution environment for multi-finger gesture authoring tool 12 with which a developer (e.g., a programmer or other user) may interact to specify the behavior associated with a particular gesture or set of gestures to be detected and processed by a presence-sensitive (e.g., touch-sensitive) display 19 of computing device 14. That is, multi-finger gesture authoring tool 12 provides a software studio that allows developer to specify characteristics of individual gestures to be detected and processed by computing device 14. For purposes of example, computing device 14 may be a mobile computing device 14 (e.g., mobile phone or mobile tablet), although the computing device may be any device that is operatively coupled to a presence-sensitive display 19 (e.g., a computing device coupled to a projector, a projector screen or other visual display device) with which a user interacts using gestures. For example, computing device 14 may be a processor or other suitable computing environment for output graphical content for display at a remote device, in accordance with one or more techniques of the present disclosure. Graphical content, generally, may include any visual information that may be output for display, such as text, images, a group of moving images, etc.

As shown in the example of FIG. 1, mobile computing device 14 provides a gesture-based user interface that allows a user 16 to direct the mobile computing device to perform certain operations. Mobile computing device 14 may allow, for example, user 16 to manipulate his or her hand to formulate complex gestures involving multiple figures, referred to generally herein as "multi-touch" gestures, although the fingers need not actually touch display 19 depending upon the presence-sensitive technology utilized by the display.

Moreover, in one example, multi-finger gesture authoring tool 12 operates in a manner that combines the strengths of both programming by demonstration and programming by declaration. For example, multi-finger gesture authoring tool 12 may enable programming by demonstration in which a developer demonstrates individual gestures, which may allow the developer to explicitly input individual gestures in an intuitive manner. That is, in some implementations, multi-finger gesture authoring tool 12 may capture demonstration data 17 from a device having a presence-sensitive display, such as mobile computing device 14 or a separate computing device 13 that may be used for development purposes. This may allow a developer to create target interaction behaviors by directly demonstrating them on the presence-sensitive display 15.

Furthermore, in some implementations, multi-finger gesture authoring tool 12 may also integrate declaration-based features by which a developer can explicitly specify high-level behaviors for a multi-finger gesture. In one example, multi-finger gesture authoring tool 12 provides a user interface that unifies both demonstration and declaration through a video editing metaphor. That is, in one example implementation, multi-finger gesture authoring tool 12 may present an interface that allows a developer to define and edit gestures as if the developer where editing and overlaying one or more video clips. In one example, multi-finger gesture authoring tool 12 presents a user interface that graphically presents each gesture as an associated video clip graphic depicted along a timeline. Moreover, tool 12 may receive input indicating manipulation of one or more of the video clip graphics along the timeline to define a complex gesture based on the one or more previously gestures associated with the video clip graphics. As such, in this example implementation, the interface and functionality provided by multi-finger gesture authoring tool 12 may allow a developer to treat each gesture in the way that is similar to a video clip, which can be replayed and composed. In one example implementation, the user interface of multi-finger gesture authoring tool 12 allows the developer to demonstrate a gesture in a manner that is analogous to recording a video clip, revise the demonstration in a manner that is analogous to cutting a video clip, compose high-level, compound behaviors by assembling demonstrated gestures on the timeline in a manner that is analogous to composing a video, and/or attach callback actions in a manner that is analogous to mixing audio.

In this way, as described herein, one example implementation of multi-finger gesture authoring tool 12 provides a user interface that is based on the video editing metaphor that integrates both programming by demonstration and declaration for authoring multi-finger behaviors. Multi-finger gesture authoring tool 12 may provide certain functionality that allows a developer to utilize a set of methods for composing complex, high-level touch behaviors based on the timeline, including creating a flexible transition between finger movements, and either sequential or parallel composition or compound gestures. Multi-finger gesture authoring tool 12 enables a developer to, for example, revise a demonstrated gesture, assemble individual gestures to form compound gestures, specify properties such as time constraints (which may be difficult to learn from an example), and attach event callbacks and software functions to points within the timeline.

Furthermore, in some examples, a developer is able to test these gestures in multi-finger gesture authoring tool 12 and output module 18 to handle these multi-finger behaviors when integrated within applications 20. For example, upon defining the gestures, a developer may direct multi-finger gesture authoring tool 12 to generate and output module that handles these multi-finger behaviors and may be integrated within one or more software applications 20 (e.g., an operating system or user-level software application) for execution by mobile computing device 14. This disclosure describes various examples of touch behaviors and example techniques applied by multi-finger gesture authoring tool 12 including, in one example implementation, techniques for generating a probabilistic event model for use within module 18 from examples provided by developer. As such, examples described herein of multi-finger gesture authoring tool 12 may enable developer to create rich interaction behaviors, such as touch-based behaviors.

Figure 2:
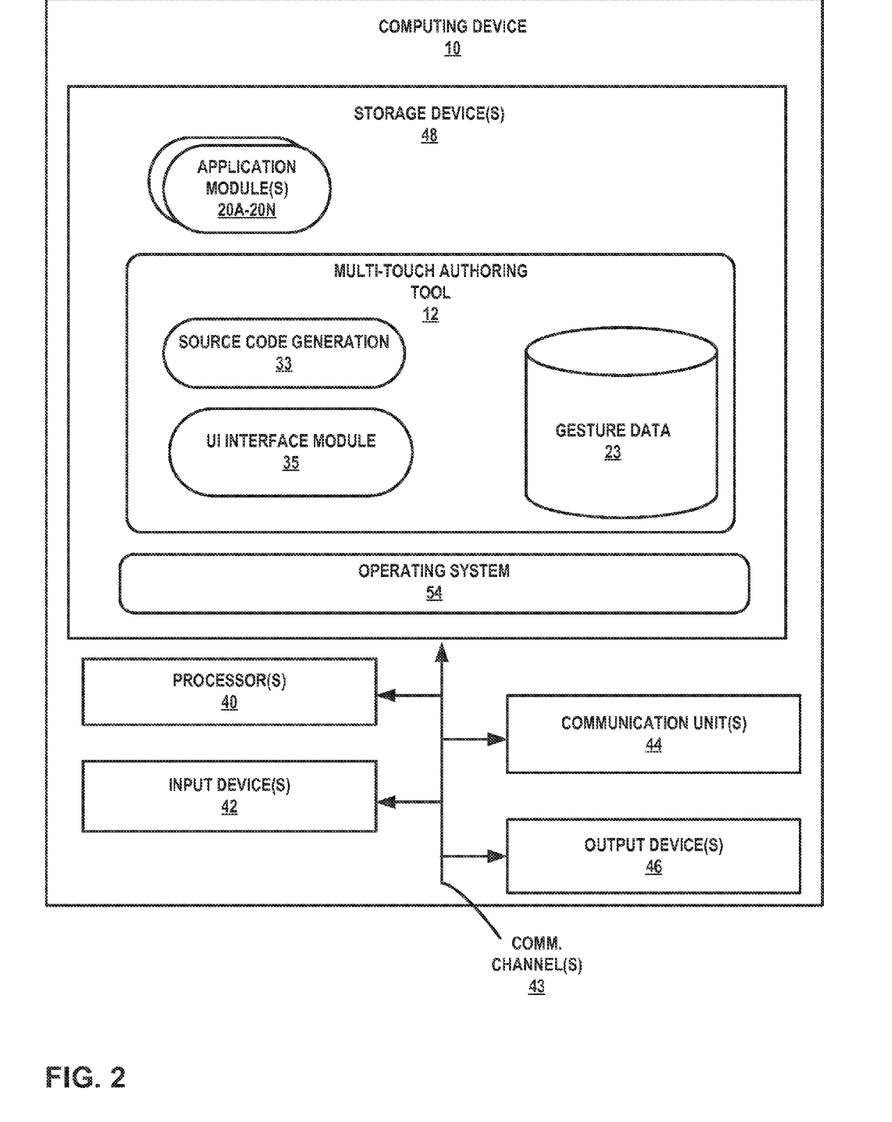
FIG. 2 is a block diagram illustrating further details of one example of a computing device shown in FIG. 1, in accordance with one or more aspects of the present disclosure.

FIG. 2 is a block diagram illustrating further details of one example of a computing device 10 shown in FIG. 1. FIG. 2 illustrates only one particular example of computing device 10, and many other examples of computing device 10 may be used in other instances. Moreover, although shown in FIGS. 1 and 2 as a stand-alone computing device 2 for purposes of example, a computing device may be any set of components or system that includes one or more processors 40 or other suitable computing environment for executing software instructions.

As shown in the specific example of FIG. 2, computing device 10 includes a computing system for providing an execution environment for executable software instructions.

In this example, computing device 10 comprises one or more processors 40, one or more input devices 42, one or more communication units 44, one or more output devices 46, and one or more storage devices 48. Each of components 40, 42, 44, 46 and 48 may be interconnected (physically, communicatively, and/or operatively) by communication channels 43 for inter-component communications. In some examples, communication channels 43 may include a system bus, a network connection, an inter-process communication data structure, or any other channel for communicating data.

Processors 40, in one example, are configured to implement functionality and/or process instructions for execution within computing device 10. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store program code and/or data for use within computing device 10 during operation. In the example of FIG. 2, storage devices 48 store software components includes operating system 54, multi-finger gesture authoring tool 12, and software application modules 20A-20N (collectively, "applications 20"). Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 10 (e.g., applications 48) to temporarily store information during program execution. Storage devices 48, in some examples, comprise one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 10, in some examples, also includes one or more communication units 44. Computing device 10, in one example, utilizes communication units 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, computing device 10 utilizes communication unit 44 to wirelessly communicate with another computing device that is operably coupled to computing device 10.

Computing device 10, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 10. Output device 46, in some examples, is configured to provide output to a user using tactile, audio, or video stimuli. Output device 46, in one example, includes a sound card, a video graphics adapter card, optical projector, a presence-sensitive display, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

Operating system 54, in some examples, controls the operation of components of computing device 10. For example, operating system 54, in one example, facilitates the communication of multi-finger gesture authoring tool 12 with processors 40, communication units 44, storage device 48, input device 42, and output device 46. One or more components of storage devices 48, including multi-finger gesture authoring tool 12 and applications 20, may each include program instructions and/or data that may be executable by computing device 10.

Multi-finger gesture authoring tool 12 may include various software modules or components, such as a user-interface module 35 and a source-code generation module 33 that operate in accordance with the techniques described herein. As one example, multi-finger gesture authoring tool 12 may include instructions that cause computing device 10 to perform one or more of the operations and actions described in the present disclosure. In addition, multi-finger gesture authoring tool 12 may store a variety of data, such as gesture data 23 that specifies the characteristics and behavior of gestures in accordance with this disclosure. For example, gesture data 23 may include data associated with a plurality of multi-finger gestures including, for each of the multi-finger gestures, demonstration data representative of a demonstration of the multi-finger gesture on device 13 and declaration data that specifies one or more constraints for the gesture. In some examples, one or more of the components illustrated in storage device 48 may be implemented in hardware and/or a combination of software and hardware.

Figure 3A:
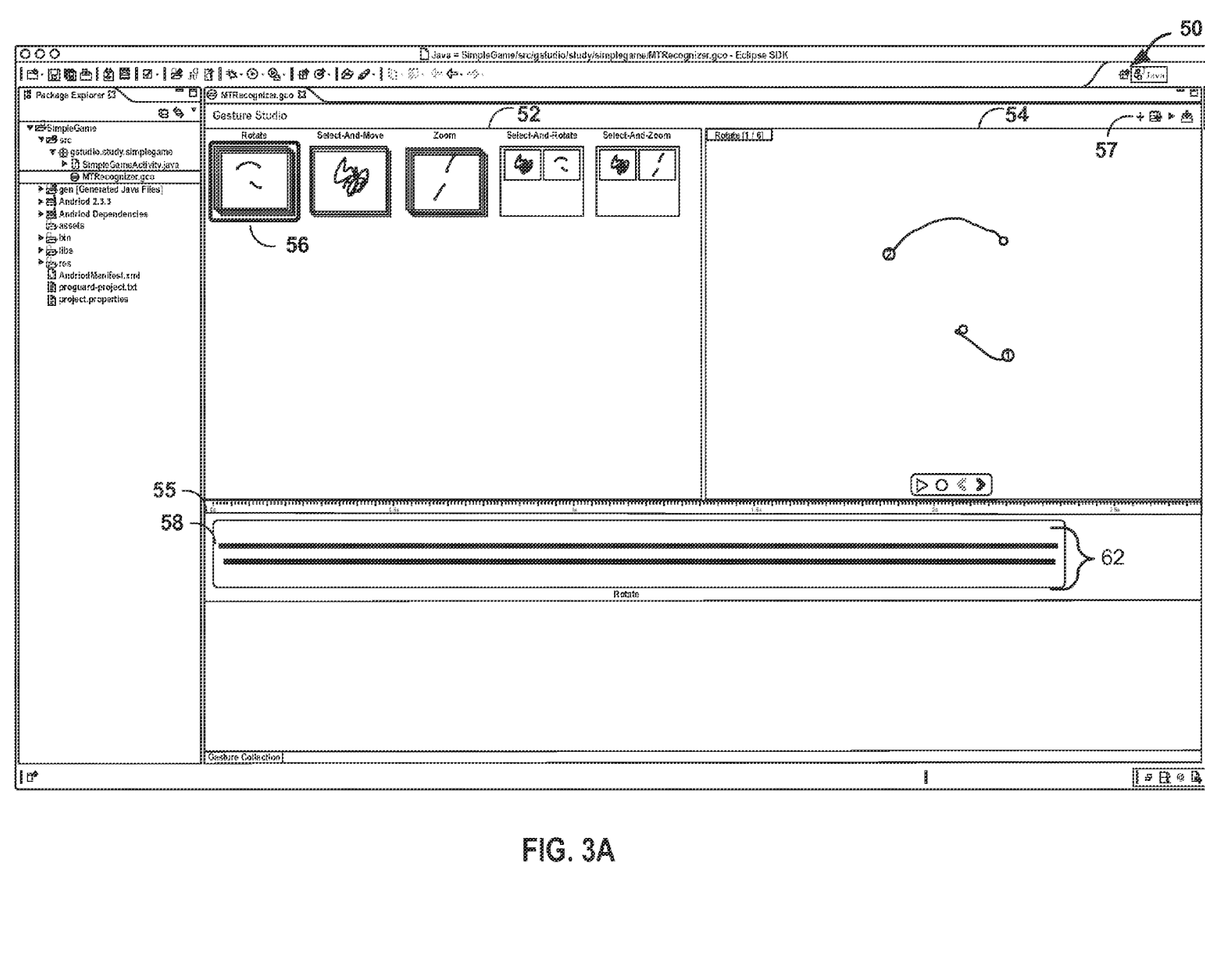
FIGS. 3A, 3B, 4 and 5 are diagrams illustrating example user interfaces presented by the multi-finger gesture authoring tool described herein.

FIG. 3A illustrates an example user interface 50 output by multi-finger gesture authoring tool 12 for display. In one example, multi-finger gesture authoring tool 12 executes as a plug-in in a development environment for an operating system and is embedded as part of the development environment user interface. For purposes of illustration, user interface 50 of FIG. 3A is described in reference to an example in which developer wishes to implement a multi-finger application 20 that allows a user to design a room layout by moving and resizing objects in a scene with multiple fingers. In this example, a developer may desire application 20 to provide a user interface having gestures that allow a user to manipulate his or her hand to: 1) select and move an individual object with one finger, 2) zoom the entire scene with two-finger pinching, 3) rotate the scene with two-finger rotating, 4) resize an object with one-finger selecting the object and two-other-finger pinching, and 5) rotate an object with one-finger selecting the object and two-other-finger rotating. In this example, panning and zooming are to be mutually exclusive;

that is, only one can be active at a time, to avoid unintended changes to the scene or object being manipulated.

In this example, multi-finger gesture authoring tool 12 presents interface 50 to include a gesture bin 52 that contains icons associated with data specifying behaviors for a collection of gestures, which can be demonstrated, imported from other projects or built-in. Gesture player 54, at the top right, displays finger events and motion trajectories of a gesture when the gesture is being recorded or replayed. In this example implementation, timeline window 55 presents temporal information of a selected gesture, and relationships (such as parallel and sequential) between multiple gestures that are involved in a compound behavior. With multi-finger gesture authoring tool 12, developer can utilize her knowledge or previous experience in video editing with creation of interaction behaviors.

In a typical environment, developer first connects device 13 (e.g., a multi-finger tablet or other suitable device) with a presence-sensitive display 15 to computing device 10, where she develops the user interface to be supported by mobile computing device 14. In this example implementation, multi-finger gesture authoring tool 12 remotely launches a touch sampling application on connected device 13 and establishes a communication session, e.g., a socket, to communicate with the application. The touch sampling application, running on device 13, for example, may capture touch events and send data indicative of the touch events to multi-finger gesture authoring tool 12 as demonstration data 17. In some examples, presence sensitive display 15 of device 13 may detect an object at and/or near the screen of the presence-sensitive display. Presence-sensitive display 15 may determine a location (e.g., an (x,y) coordinate) of the presence-sensitive display at which the object was detected, and multi-touch authoring tool may receive demonstration data 17 as a series of locations defining a path for each finger of the multi-finger gesture. As one example range, presence-sensitive display 15 may detect an object, such as a finger or stylus that is within 2 inches or less of the physical screen of the presence-sensitive display. In another example range, presence-sensitive display 15 may detect an object six inches or less from the physical screen of the presence-sensitive display and other exemplary ranges are also possible. Presence-sensitive display 15 may determine the location of the display selected by a user's finger using capacitive, inductive, and/or optical recognition techniques. In some examples, presence sensitive display 15 provides output to a user using tactile, audio, or video stimuli.

Referring again to the example implementation illustrated in FIG. 3A, to add a new multi-finger gesture to gesture bin 52, multi-finger gesture authoring tool 12 presents an Add button 57 in a toolbar and, responsive to input by the developer, adds a new gesture template record 56 to gesture bin 52. Multi-finger gesture authoring tool 12 may further receive input from the developer representing a name of the gesture, "Rotate" in this example. The multi-finger gesture authoring tool 12 may then receive data indicative of a demonstration of the Rotate gesture in response to input indicative of a selection of a Record button in a view provided by gesture player 54 and subsequent performance of a two-finger rotation gesture on presence-sensitive display 15 of device 13 by the developer.

In one example implementation, as the developer performs the gesture, multi-finger gesture authoring tool 12 captures demonstration data 17 and controls gesture viewer 54 to output a graphical visualization of finger landing and lifting operations as well as finger motion trajectories that developer produces on device 13 in real-time. Gesture viewer 54 may, for example, display traces representative of the finger motions to allow developer to verify whether the gesture has been performed correctly. Once the demonstration is finished (by an indication of a selection of a Stop Recoding button or after a timeout), multi-finger gesture authoring tool 12 associates demonstration data 17 for the demonstrated example with the current gesture—Rotate in this case. In some examples, gesture player 54 may then transition to a playback mode such that the developer can replay the recorded example.

In some implementations, multi-finger gesture authoring tool 12 is configured to allow the developer to repeat this process so as to demonstrate (input and record) multiple examples for a gesture and navigate between examples by clicking on Previous and Next buttons. Example implementations of multi-finger gesture authoring tool 12 may cause the display to present a user interface such that a gesture associated with multiple previously-demonstrated examples may be rendered in gesture bin 52 as a stack of video clips, as is the case with Rotate gesture 56 in this example. To continue the example, developer adds examples for three gestures: one-finger Select-And-Move, two-finger Zoom and two-finger Select-And-Move.

In one example, when a gesture example is selected, tool 12 may generate timeline window 52 to visualize the touch sequence as a graphic clip 58, e.g., a rounded rectangle. In such implementations, tool 12 constructs timeline 55 such that each finger involved in the gesture example is depicted as one of a set of horizontal lines 62 in the clip 58. The start of each line 62 corresponds to when the corresponding finger touches down and the end denotes when the finger lifts up.

In some cases, a gesture example may involve multiple changes in the number of fingers on the touchscreen. In an example implementation, tool 12 may define and output the user interface to mark each of such changes with a vertical line in clip 58, and these vertical lines may divide the clip into multiple segments. For example, for a two-finger Zoom gesture, the number of fingers in a demonstration will transit from 0 to 1 and to 2, and then decrease to 1, and finally return 0. Tool 12 may enable developer 12 to specify declaration data representative of temporal constraints and behaviors with respect to transitions between segments. For example, developer may desire that both the 0 and 1-finger segments for a two-finger Zoom gesture are required and that a user has to lift all his fingers when finishes the gesture, before starting a next gesture, or exclude the 0-finger segments so that a user can, for example, switch to a Move gesture without having to lift his finger—returning 0 finger.

Figure 3B:
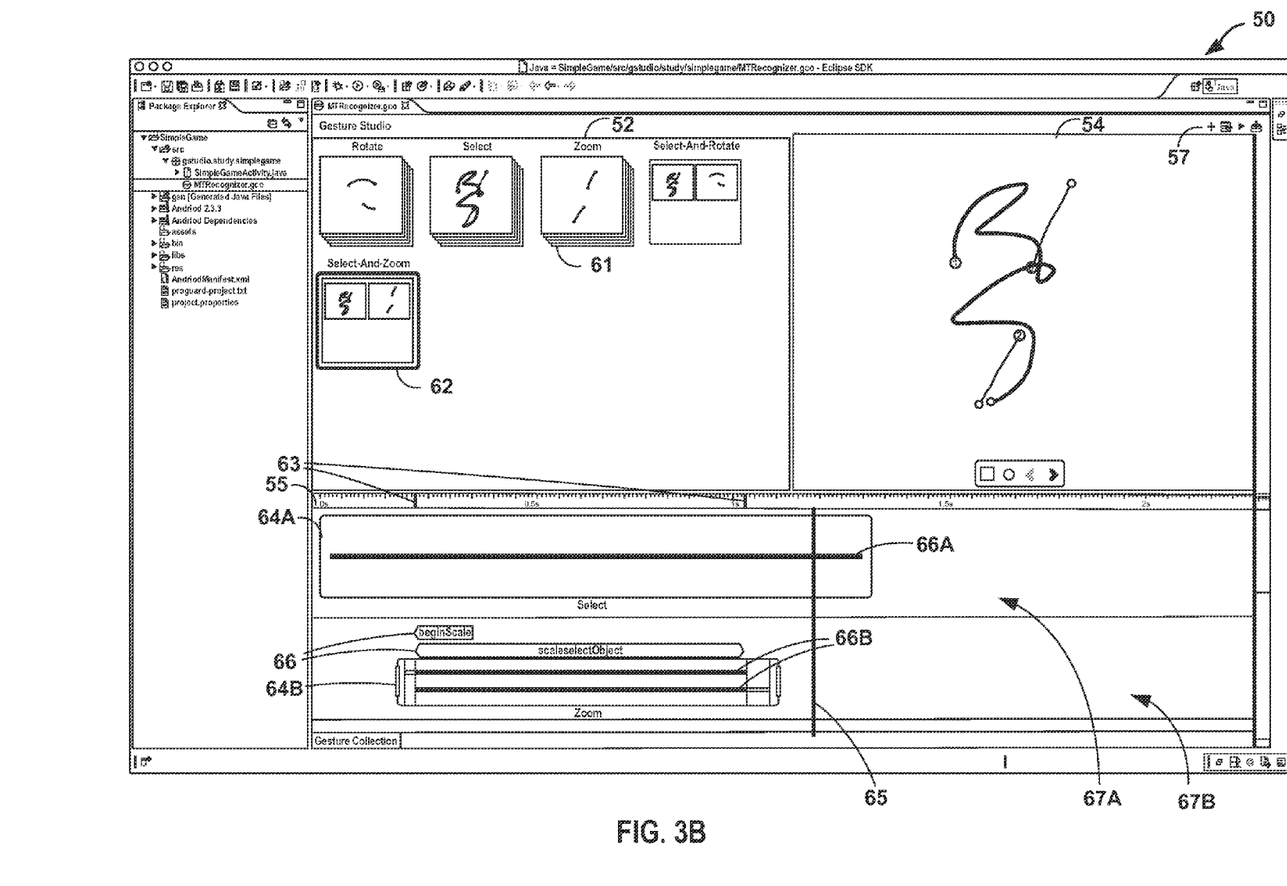

Further, in some examples, tool 12 may enable developer to create compound behaviors by composition of, in this example, the three basic gestures that the developer has previously demonstrated (i.e., Rotate, Select-And-Move, and Zoom). Using these three basic gestures, the user can create, for example, two additional gestures to: a) resize an object with one-finger selecting the object and two-other-fingers pinching, and b) rotate an object with one-finger selecting the object and two-other-fingers rotating. To initiate this process, similar to creating a basic gesture, multi-finger gesture authoring tool 12 responds to an indication of a selection of the Add button in multi-finger gesture authoring tool 12 toolbar to create a gesture named, in this example, Select-And-Zoom in gesture bin 52. However, as shown in the example of FIG. 3B, instead of receiving and processing demonstration data for this new gesture, multi-finger gesture authoring tool 12 may enable developer to compose a target behavior for the Select-And-Zoom gesture by reusing data associated with the basic gestures that she has demonstrated earlier. In this way, multi-finger gesture authoring tool 12 may enable developer to create a gesture for Select-and-Zoom by way of composition from earlier gestures without requiring further demonstration.

To do so, an example implementation of multi-finger gesture authoring tool 12 may be responsive to input indicative of developer dragging one or more gestures (e.g., a Select gesture) from gesture bin 52 and dropping the gesture(s) into a first track 67A of Timeline view 52, which in this example is currently empty for this new gesture. Multi-finger gesture authoring tool 12 may similarly detect input indicative of the developer dragging the Zoom gesture 61 into the second track 67B. In response, in this example, authoring tool 12 may generate user interface 50 to present video clips 64A, 64B as graphical representations of the Select gesture and the Zoom gesture, respectively. Multi-finger gesture authoring tool 12 may then receive input indicative the developer manipulating the gestures as if she were overlaying video tracks using video-authoring software. Multi-finger gesture authoring tool 12 may, for example, receive declaration data in the form of input indicative of a shift or a resizing of one or both of graphical video clips 64A, 64B within the timeline and thereby specify one or more temporal requirements for the multi-finger gesture with respect to the timeline. For example, multi-finger gesture authoring tool 12 may receive input indicative of a movement and a resizing of video clip 64A representative of the Select gesture and video clip 64B representative of the Zoom gesture in timeline window 55 so that the Select clip begins before the Zoom clip and has a duration that lasts at least to the point in time when the Zoom clip ends. In this example, multi-finger gesture authoring tool 12 receives declaration data from the developer that, in effect, specifies a temporal constraint that a user interface object can be zoomed by two fingers only when the object has already selected and remains selected by another finger. At any time during this composition process, multi-finger gesture authoring tool 12 may, responsive to input indicative of selection of play button within gesture player 54, regenerate and display a composite video animation for the overlaid gestures and display finger events and motion trajectories for the gesture being constructed. During this playback period, indicator 65 provides a graphical indicator of the playback position in time so as to allow developer correlate the visual animation within gesture player 54 with video clips 64A, 64B defined within timeline window 55.

In one example, multi-finger gesture authoring tool 12 enables the developer to specify the segments of the finger sequence, from a demonstrated example, for a target gesture using active regions. For example, multi-finger gesture authoring tool 12 may, in response to input indicative of a selection of a gesture clip, e.g., video clip 64B, cause two vertical bars 63 to be displayed on the timeline ruler to mark the active region video clip 64B. These two markers 63 may denote the beginning and end of the active region. In one example, multi-finger gesture authoring tool 12 may automatically determine the active region by selecting segments that have significant time duration, e.g., in the case of FIG. 3B, only the 2-finger segment of the Zoom example is included. The developer can change the default active region by dragging these two markers to another change point on the timeline.

In some example implementations, multi-finger gesture authoring tool 12 enables developer to not only create gesture input but also specify software-based callback actions 66 to be invoked when a gesture event takes place, a useful part of an interaction behavior. In one example of multi-finger gesture authoring tool 12, a callback action is an object that can be attached to a segment in clip 58 within the timeline view 52.

The previous example demonstrated parallel composition in which multiple parallel tracks are manipulated on the timeline. In addition, example of multi-finger gesture authoring tool 12 allow a developer to specify a sequential composition for composing a gesture or a mixture of parallel and sequential composition. In sequential composition, multi-finger gesture authoring tool 12 enables developer to provide input indicating that multiple gestures are to be added to the same track within timeline window 55. In these examples, authoring tool 12 updates timeline window 55 to display a graphical video clip for one gesture on the same track as a video clip for another gesture. Multi-finger gesture authoring tool 12 may, in this example, operate responsive to input indicative of manipulation of multiple video clips on the same track. In this case, a second gesture may represent a second sequence of finger motions and events that are defined to occur after the first gesture has finished.

Figure 4:
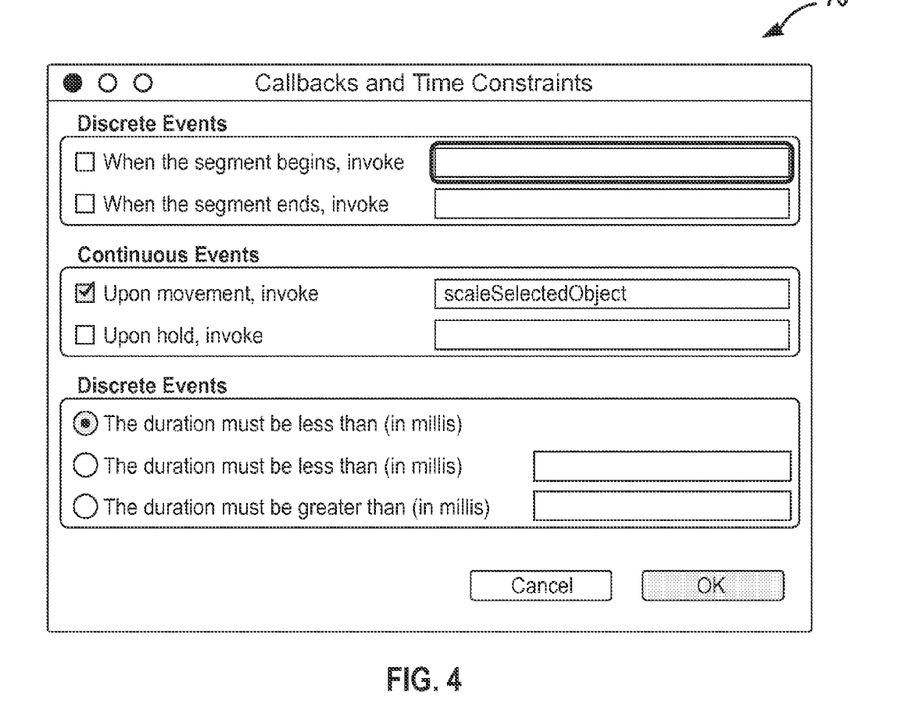

FIG. 4 illustrates an example window 70 presented by the interface of multi-finger gesture authoring tool 12 that allows developer to choose to attach one or more software callbacks for module 18 to the beginning of a segment, the end of the segment, or for the entire duration of the segment (e.g., constantly zooming the scene as the fingers pin). A developer can also give the callback action a descriptive name, such as scaleSelectedObject, as shown in FIG. 4. A callback action can also be attached for a timeout event since the beginning or the end of a segment.

Figure 5:
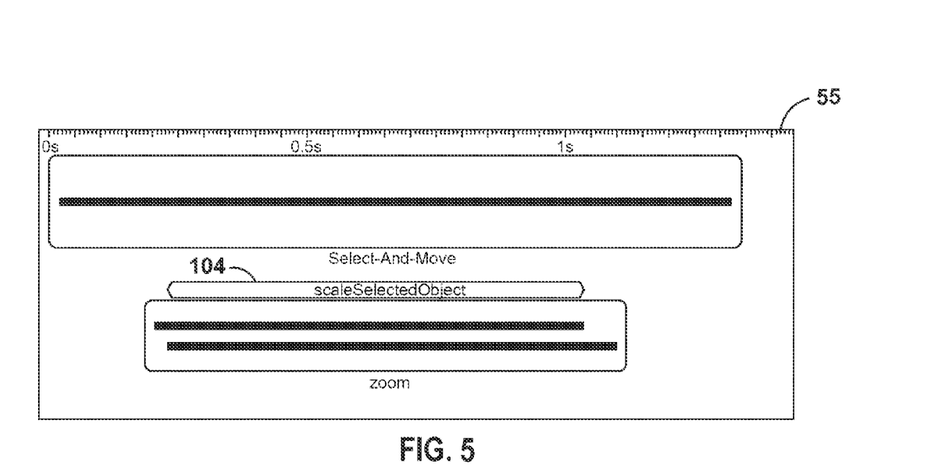

As show in FIG. 5, timeline window 55 includes a callback indicator 104 showing a callback action as an attachment on top of the corresponding segment in the timeline view. In this example, a callback action of scaleSelectedObject has been added to the second segment associated with the Zoom gesture.

Once these target behaviors are demonstrated and composed, developer may direct multi-finger gesture authoring tool 12 to test the behavior and functionality specified for the gesture. For example, developer may begin this process by clicking on the Test Run button in the toolbar of multi-finger gesture authoring tool 12, which brings up a test window. Similar to demonstrating an example gesture, the test window presents a visualization of the finger movements as developer performs these multi-finger behaviors on connected device 13 or other device.

As developer tests different gestures, tool 12 outputs user interface 50 so that the test window displays test results in real time, including the type, state, and probability distribution of all the target gesture types. The test window may also show whether any callback action is invoked in the event one is attached to the gesture. As such, developer can correct a misinterpreted behavior by adding more examples to a demonstrated gesture or revising a composition. That is, tool 12, executing in a test mode, receives demonstration data representative of a demonstration of the multi-finger gesture being created. Tool 12 outputs an indicator for each software callback function within the source code that is invoked in response to the demonstration data. Once satisfied with the testing results, developer clicks on an Export button from multi-finger gesture authoring tool 12 toolbar, causing the tool to generate and export module 18 that includes the callbacks for handling these target touch behaviors.

In this way, developer may utilize the features of multi-finger gesture authoring tool 12 to define requirements for rich, touch-based behaviors from a set of basic gestures. By applying certain constraints (such as temporal relationships)

to a combination of basic gestures, developer 12 can specify a compound gesture that enables new behaviors and can invoke different application semantics. With certain conventional techniques, using a single approach, either demonstration or declaration, to address the entire range of touch gesture behaviors without distinguishing between compound and basic gestures may present challenges for the developer. Instead, multi-finger gesture authoring tool may allow developer to utilize either demonstration or declaration, or combinations thereof, to capture and specify different characteristics of user input.

For example, a basic gesture, such as pinching, is often performed by a coherent motion with a group of fingers. The basic gesture is often concerned with primitive events such as finger landing or lifting, and fine movements such as two fingers moving apart. Specifying a basic gesture based on these low-level, noisy events can be tedious, unintuitive and intractable to manage. In contrast, a demonstration-based approach supported by multi-finger gesture authoring tool 12 can efficiently capture these gestures by automated learning from examples due to the large amount of training samples generated by repetitive movements of such a gesture.

Compared with basic gestures, a compound gesture such as Select-and-Rotate employs high-level constraints such as temporal relationships between basic gestures. For example, the order of execution of each basic gesture in the composite is sometimes critical for correctly performing a target behavior. These high-level constraints often appear succinct to the developer, and it is more efficient to directly describe them instead of demonstrating them.

As a result, multi-finger gesture authoring tool 12 employs features that enable developer to utilize a combination of approaches to address basic and compound gestures and to integrate them to form rich interaction behaviors. That is, in one example, the user interface and operation of multi-finger gesture authoring tool 12 enables developer to use a demonstration-based approach to create basic gestures and a declaration-based approach to compose compound ones. For a basic gesture, the order in which each finger lands or lifts may be irrelevant as long as a designated number of fingers are in action. Covering all the possible finger orders may not only be unnecessary, but more importantly can sometimes result in extremely complex specifications that can be error-prone or inefficient inference models that are sensitive to specific finger orders. For example, in a five-finger-pinch gesture, the number of different sequences that the five fingers can touch down is 5×4×3×2×1=60. In contrast, in a compound gesture, a different finger (often from a different hand) may be used to perform a different basic gesture. As the order of execution of each basic gesture in the composition matters, it is sometimes important to capture the order of finger groups in action, although within each group—a basic gesture, the finger order becomes less important.

In one example, source code generation module 33 of multi-finger gesture authoring tool 12 generates source code by first computing a probabilistic finite state machine for an example gesture from developer and any composition via timeline 55. Transitions between states upon events can be modeled using the probabilistic finite state machine, which includes a finite set of states and a set of probabilistic transitions between states trigged by events.

In one example of multi-finger gesture authoring tool 12, source code generation module 33 constructs each state within the state machine to contain data representing a set of fingers on the touch surface, i.e., an identifier for the gesture with which the state machine is associated, identifiers for which gesture segment each track is in, and identifiers for which track each finger is associated. Given a probabilistic state machine, multi-finger gesture authoring tool 12 calculates a probabilistic distribution over next possible states, $S_{n+1}$, given a sequence of touch events, $e_i$ (the $i_{th}$ event in the sequence), which may be represented as follows:

$$P(S_{n+1}|e_{1:n+1}) = P(S_{n+1}|e_{n+1}, e_{1:n}). \qquad (1)$$

In the state machine, a touch event can be finger-down (a finger lands), finger-up (when a finger lifts) and finger-move (when one or more fingers moves on the screen). Since touch events come in sequentially, Equation 1 can be reformulated by leveraging the probabilistic distribution over the current states, $S_n$, to allow incremental inference at runtime:

$$\sum_{S_n} P(S_{n+1}|e_{1:n+1}, s_n) P(s_n|e_{1:n}) = \sum_{S_n} P(S_{n+1}|e_{n+1}, s_n) P(s_n|e_{1:n}). \qquad (2)$$

Equation 2 leverages the fact that $S_{n+1}$ only relies on its previous state $S_n$ and the touch event at step n+1, $e_{n+1}$.

In a touch event sequence, a finger-move event can often have different interpretations for user operation. For example, for a two-finger movement event, based on how much the distance between the two fingers has varied, it is often uncertain to determine if the movement is to perform a pinching or swiping operation. Thus, another type of random variable, $o_i$, is used to accommodate such uncertainty:

$$\sum_{S_n} \left[ P(s_n|e_{1:n}) \sum_{o_{n+1}} P(o_{n+1}|e_{n+1}) P(S_{n+1}|o_{n+1}, s_n) \right], \qquad (3)$$

where $o_i$ denotes a single user operation inferred from the touch event at step i. A user operation, $o_i$, can be finger-down, finger-up or an application-specific user operation (based on finger movements)—learned from demonstrated examples, e.g., pinch. In particular, when $e_i$ is a finger-down or up event, $o_i = e_i$.

Further, $P(S_{n+1}|o_{n+1}, s_n)$ can be rewritten using a state machine convention as:

$$\sum_{S_n} P(s_n|e_{1:n}) \sum_{o_{n+1}} P(o_{n+1}|e_{n+1}) P\left(s_n \xrightarrow{o_{n+1}} s_{n+1}\right). \qquad (4)$$

Notice that Equation 4 is recursive in that $P(s_n|e_{1:n})$ can be calculated in a similar way. As each touch event is observed, multi-finger gesture authoring tool 12 incrementally updates the probabilistic distribution of possible states in the state machine. To use Equation 4, in one example, multi-finger gesture authoring tool 12 calculates two types of quantities:

$$P(o_{n+1}|e_{n+1}) \text{ and } P\left(s_n \xrightarrow{o_{n+1}} s_{n+1}\right).$$

Multi-finger gesture authoring tool 12 may, for example, operate in accordance with an inference model that computes two quantities upon each touch event (see Equation 4): $P(o_{n+1}|e_{n+1})$ that is concerned with recognizing user operations from a finger-move event, and $$P\left(s_n \xrightarrow{o_{n+1}} s_{n+1}\right)$$

that relies on the state machine transitions. Multi-finger gesture authoring tool 12 computes these probabilistic distributions from the demonstrated examples and the timeline composition, as described herein.

Figure 6:
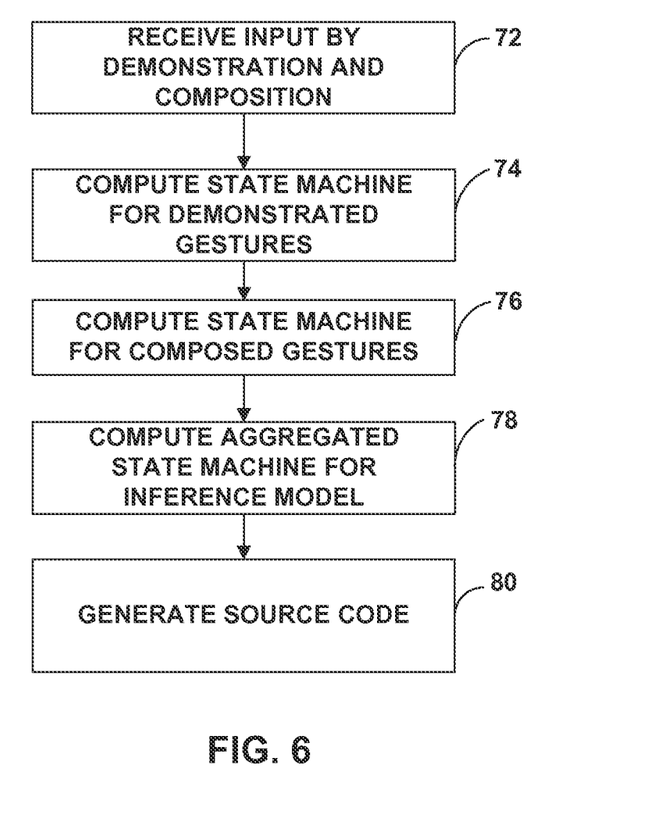
FIG. 6 is a flowchart illustrating example operation of a multi-finger gesture authoring tool executing on computing device.
Figure 7A:
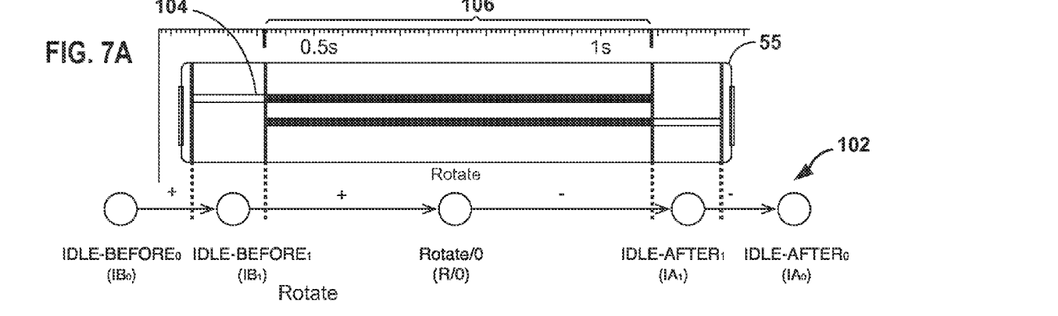
FIGS. 7A-7C are process diagrams illustrating operation of the multi-finger gesture authoring tool in computing state machines for an inference model based on gesture data captured from a developer or other user.
Figure 7B:
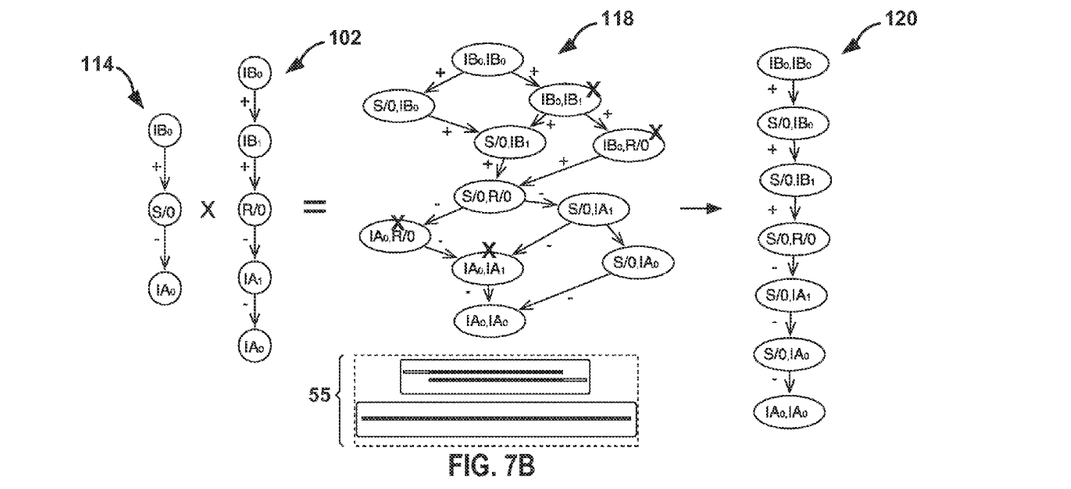
Figure 7C:
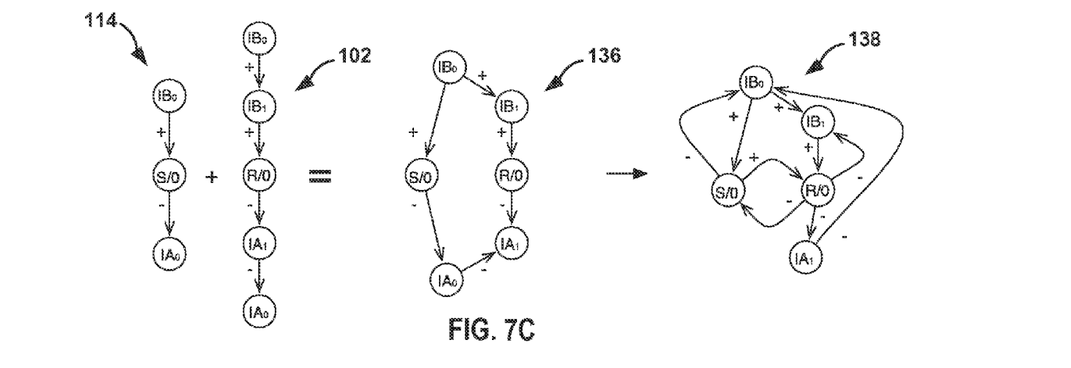

FIG. 6 is a flowchart illustrating example operation of one implementation of multi-finger gesture authoring tool 12 executing on computing device 10 as described in reference to FIGS. 7A-7C. Initially, in this example, multi-finger gesture authoring tool 12 presents user interface 50 and receives input from a developer with respect to a demonstration of one or more multi-finger gestures and/or a composition of a compound multi-finger gesture by way of timeline window 55, as described above (72). From this input, as further explained below, multi-finger gesture authoring tool 12 may compute one or more state machines for basic gestures from the demonstrated examples (74).

In addition, presents user interface 50 and receives from developer declaration data specifying one or more constraints associated with the multi-finger gesture. Multi-finger gesture authoring tool 12 may receive, for example, declaration data indicative of an interaction with one or more graphical video clip representations within timeline 55 that defines temporal constraints and software callbacks for the multi-finger gestures.

Next, multi-finger gesture authoring tool 12 may compute one or more state machines for any composed gestures by aggregating the state machines of the basic gestures based on the products of the multiple state machines (76). Multi-finger gesture authoring tool 12 may compute a state-machine-based inference model by unifying identical states and capturing possible transitions across different gestures (78). In other words, multi-finger gesture authoring tool 12 may compute state machines for basic gestures from the demonstrated examples, and may extend compositions of them into compound gestures by products of multiple state machines. Multi-finger gesture authoring tool 12 may compute a state-machine-based inference model by combining the state machines them into a single larger state machine for the target gesture by unifying identical states and capturing possible transitions across different gestures. In some examples, multi-finger gesture authoring tool 12 generates a module 18 (e.g., source code, firmware, logic definition) capable of detecting these multi-finger behaviors in accordance with the computed inference model and which may be integrated within application 20 (e.g., an operating system or user-level software application) for execution by mobile computing device 14 (80).

To further illustrate this process, for basic gestures, multi-finger gesture authoring tool 12 may compute a state machine from a demonstrated gesture by dividing the demonstrated gesture into a sequence of segments by its number of fingers. Each segment exhibits certain finger movements. A segment may involve finger-move events that are either intended by the user for performing repetitive operations of the gesture (e.g., continuously zooming) or accidental (e.g., for a two-finger gesture, the first landed finger might have moved slightly before the second finger lands). Multi-authoring tool 12 may automatically eliminate segments that might have accidental movements from the gesture's active region.

In one example, multi-finger gesture authoring tool 12 creates a chain of states for the active segments. As one example, FIG. 7A illustrates an example linear state machine 102 computed by multi-finger gesture authoring tool 12 from a video clip 104 representative of the gesture data 23 for a two-finger Rotate gesture demonstrated by developer. These states may be uniquely named using the name of the gesture and the order of the state in the active region, e.g., Pinch/0, DoubleTap/2.

In the example of FIG. 7A, for the segments outside of the active region 106, as determined by multi-finger gesture authoring tool 12, states are named in such a way that is independent of the gesture in which the segment resides. For example, multi-finger gesture authoring tool 12 may inserts a state named IDLE-BEFORE$_N$ (IB$_N$) is before the active region, where N represents the number of fingers, and inserts a state named IDLE-AFTER$_N$ (IA$_N$) after the active region. In addition, multi-finger gesture authoring tool 12 may insert an initial state named IB$_0$ before any finger touches down. The label IDLE may be used to provide an indication that these states are not associated with any gestures and that no gestures have yet been detected.

Upon inserting these idle states, multi-finger gesture authoring tool 12 may construct state machine 102 as transitioning to a begin state of active region 106 from the initial empty finger by adding a successive finger down transition from IB$_0$ to IB$_1$ to until the begin state of the active region. Multi-finger gesture authoring tool 12 may further constructs state machine 102 to transition out from the end state of active region 106 by adding a successive finger up transition from the end state to the corresponding idle state until IA$_0$. Note that, for a demonstrated gesture, its state machine can be represented as a linear chain starting from IB$_0$ to IA$_0$, as shown, or in circular as IB$_0$ and IA$_0$ are indeed identical.

With respect to compound gestures, one example implementation of multi-finger gesture authoring tool 12 may automatically compute the state machines from state machines previously computed for the basic gestures from which the compound gesture is composed. That is, multi-finger gesture authoring tool 12 may construct a state machine for a compound gesture by aggregating from the state machines of the basic gestures from which the compound gesture is composed. Moreover, multi-finger gesture authoring tool 12 may utilize a two-step processes to generate the state machine for a compound gesture by combining the state machines of the basic gestures in the same track (from sequential composition), and then assembling the state machines generated from the first step (due to parallel composition).

In a sequential composition of gestures, multi-finger gesture authoring tool 12 may connects the state machines of the basic gestures in accordance with the order specified in the timeline view. Multi-gesture authoring tool 12 connects two state machines, for example, by merging their idle states between the two gestures.

In a parallel composition of gestures, since each track is running asynchronously, multi-finger gesture authoring tool 12 may use the product of all the state machines of its tracks as the state machine for compound gesture. However, since there are additional time constraints specified in the timeline view (e.g., pointing finger needs to be laid down before two pinching fingers), multi-finger gesture authoring tool 12 may remove any states and transitions that violate the temporal constraints. Multi-finger gesture authoring tool 12 may automatically detect the temporal constraints from the order of the gesture clips placed in timeline view 55. For example, when gesture clip A starts earlier than gesture clip B in timeline view 55, multi-finger gesture authoring tool 12 imposes a temporal constraint that gesture A needs to reach its active region before the first finger of B ever happens.

As one example, FIG. 7B illustrates multi-finger gesture authoring tool 12 constructing state machine 120 for a compound gesture Select-and-Rotate based on a composition by developer in which the Rotate gesture and the Select gesture are overlaid in parallel within timeline window 55. Multi-finger gesture authoring tool 12 may have previously computed state machines 114 for the Select gesture and state machine 102 for the Rotate gesture in accordance with the techniques described above. In this example, multi-finger gesture authoring tool 12 combines state machine 114 for the Select gesture and state machine 102 from the Rotate gesture that developer have overlaid in parallel within the tracks of timeline window 55. As shown in this example, multi-finger gesture authoring tool 12 computes an intermediate state machine 118 as the product of the states of state machines 114 and 102. For example, since state machines 114 and 102 have three and five states, respectively, intermediate state machine 118 would have 3×5=15 possible states, although not all states are shown for ease of illustration. Next, multi-finger gesture authoring tool 12 further processes state machine 120 for the compound gesture by eliminating any state that violates the temporal constraints from the order in which the associated clips were presented in timeline view 55. In this example, multi-finger gesture authoring tool 12 eliminates states $IB_0$, $IB_1$ and $IB_0$, R/0 since the first finger to perform the selection must be detected (state S/0, $IB_1$) before these states may be considered temporally valid. Similarly, multi-finger gesture authoring tool 12 eliminates states $IA_0$, R/0 and $IA_0$, $IA_1$. FIG. 7B illustrates the resultant state machine 120 produced by multi-finger gesture authoring tool 12, which is linear in this example.

Upon generating a state machine for each gesture in the target set of touch gestures, multi-finger gesture authoring tool 12 may combine the state machine from each of these gestures to form a single overall state machine for the device by merging identical idle states. To enable smooth transitions between gestures (i.e., when a gesture finishes, it can transition to another gesture including itself without lifting all fingers), multi-finger gesture authoring tool 12 may create transitions between the state machines of these gestures, or in essence, combine them into a big state machine.

FIG. 7C, for example, illustrates a simplified example in which multi-finger gesture authoring tool 12 generates a final state machine 138 to be used by computing device 14 to support two basic gestures, i.e., the Rotate gesture and the Select gesture in this example. As shown in this example, multi-finger gesture authoring tool 12 combines state machine 114 for the Select gesture and state machine 102 from the Rotate gesture by first forming an intermediate state machine 138 by merging identical states, i.e., $IB_0$ states and $IA_0$ states in this example.

Next, multi-finger gesture authoring tool 12 constructs final state machine 138 by inserting transitions that are determined as valid transitions between the states of state machines 114 and 102. In the example of FIG. 7C, multi-finger gesture authoring tool 12 has inserted transitions between S/0 and R/0 states, a transition from S/0 to $IB_0$, and a transition from $IA_0$ to $IB_0$ using information from active region 106 to determine the possible transitions between states across state machines 114, 102.

More specifically, to create such transitions, multi-finger gesture authoring tool 12 may first identify two groups of states within each state machine, the begin group of states and end group of states, i.e., all the states that can be transitioned to from other gestures and all the states that can be transitioned from to other gestures. For basic gestures, the states before and including the begin state of the active region can be transitioned to from other gestures. That is, they are the states before the gesture actually begin. Similarly, the states after and including the end state of the active region are states that can be transitioned from. The situation may be more complicated for compound gestures as there typically may be no clear definition of active region for compound gestures and the state in compound gestures are compound state from the product of multiple state machines. However, a compound gesture may be viewed as multiple tracks. Therefore, a state is in the begin group (i.e., can be transitioned to) if one of its sub-states is in the begin group of the first basic gesture in its track, and all other tracks are in or before their first basic gestures respectively. The sub-states of all other tracks are referred to herein as the mode of this compound state. Similarly, a state is in the end group (i.e., can be transitioned from) if one of its sub-states is in the end group of the last basic gesture in its track, and all other tracks are in or after their last basic gestures respectively. The sub-states of all other tracks are the mode of this compound state. A compound state in the end group can transition to a compound state as long as they have the same mode.

A basic state in the end group can be transitioned to a basic state in the begin group as long as their difference in the number of finger is one (i.e., a finger down event or a finger up event). A compound state in the end group can transition to a compound state as long as they have the same mode. A compound state can transition to a simple state if its mode is empty, and vice versa. A compound state can transition to a simple state if its mode is empty, and vice versa.

Finally, since the callbacks and time constraints are attached to the segments of the basic gestures, multi-finger gesture authoring tool 12 attaches them to the corresponding state in the state machine. In this way, multi-finger gesture authoring tool 12 may automatically construct one or more state machines to provide the framework for the state-machine based inference model to be used by applications 20 within computing device 10.

Further, in addition to computing event transition quantity $$P\left(s_n \xrightarrow{o_{n+1}} s_{n+1}\right)$$

from gesture data 23, as described above, multi-finger gesture authoring tool 12 also determines user operations from a finger-move event. That is, multi-finger gesture authoring tool 12 computes $P(o_{n+1}|e_{n+1})$ for the inference model being constructed.

In general, the user operations are identical to the patterns of finger movement within a particular gesture segment, which are defined in the demonstrated examples. One type of movement is a movement with a repetitive nature, i.e., a movement where any of its segments exhibits the same pattern as its whole. For such movements, multi-finger gesture authoring tool 12 constructs a series of preceding finger-move events within a predefined window, $P(o_{n+1}|e_{n+1-w;n+1})$, as a measure. To be velocity invariant, multi-finger gesture authoring tool 12 uses, in one example, a window size of 30 pixels in the average distance across the involved fingers have travelled on the screen.

In one example, multi-finger gesture authoring tool 12 uses likelihood probability to approximate the posterior probability. This may be particularly useful for a two-track compound state, $P((o_{n+1}^1, o_{n+1}^2)|(e_{n+1}^1, e_{n+1}^2))$, for compound movements, where training data for the compound movements may not be available. For example, the posterior probability can be approximated as:

$$P(o_{n+1}|e_{n+1}) = \alpha P(e_{n+1}|o_{n+1})P(o_{n+1}) \propto P(e_{n+1}|o_{n+1}). \quad (5)$$

Multi-finger gesture authoring tool 12 may also compute an estimation for compound states, for example, for a two-track compound state as:

$$P((o_{n+1}^1, o_{n+1}^2)|(e_{n+1}^1, e_{n+1}^2)) \propto P((e_{n+1}^1|e_{n+1}^2)|(o_{n+1}^1, o_{n+1}^2)), \quad (6)$$

and from the independence between tracks as:

$$P((e_{n+1}^1, e_{n+1}^2)|(o_{n+1}^1, o_{n+1}^2)) = P(e_{n+1}^1|o_{n+1}^1)P(e_{n+1}^1|o_{n+1}^2). \quad (7)$$

To determine the likelihood probability distribution from the demonstrated examples, multi-finger gesture authoring tool 12 may first compute a set of continuous features from the sequence of touch events in the window: $\{dx, dy, dr, da\}$, which correspond to the moved distance of the centroid of the fingers along X-axis, the moved distance of the centroid of the fingers along Y-axis, the average moved distance of the fingers along the radius direction around the centroid, and the average moved distance of the fingers along the circular direction around the centroid. Each of these features share the same domain, i.e., $[-w, w]$, where w is the window size.

One example implementation of multi-finger gesture authoring tool 12 may then discretizes these continuous features into three bins, −1, 0, and 1, which corresponds to $[-w, -w/3)$, $[-w/3, w/3]$, and $(w/3, w]$ respectively. Multi-finger gesture authoring tool 12 may use the occurrence frequency of the feature tuple in the training data as the likelihood of a given sample.

Techniques for constructing state machines for tracking gesture state as applied by multi-finger gesture authoring tool 12 have been described. For example, in one implementation, a state-machine-based inference model may be computed by multi-finger gesture authoring tool 12 based upon gesture data 23 acquired by demonstration and composition. These state machines may, in turn be utilized by multi-finger gesture authoring tool 12 for generation of module 18 and, in this manner, the module may be output so as to conform to the generated state machine.

Various embodiments have been described. These and other embodiments are within the scope of the following claims.

The invention claimed is:

1. A method comprising:
   receiving, at a processor of a computing device, first demonstration data representative of a demonstration of a first multi-finger gesture;
   receiving, at the processor, second demonstration data representative of a demonstration of a second multi-finger gesture;
   receiving, at the processor, declaration data specifying one or more constraints associated with one or more of the first multi-finger gesture or the second multi-finger gesture;
   outputting, by the processor and in response to input indicative of selection by the user, a first graphical video clip representation of the first multi-finger gesture along a timeline;
   outputting, by the processor and in response to input indicative of selection by the user, a second graphical video clip representation of the second multi-finger gesture along the timeline;
   receiving input temporally arranging the first graphical video clip and the second graphical video clip along the timeline to form a compound multi-finger gesture that includes the first multi-finger gesture and the second multi-finger gesture; and
   generating, by the processor and in accordance with the first and second demonstration data, the declaration data, and temporal constraints defined by the temporal arrangement of the first graphical video clip and the second graphical video clip along the timeline, a module configured to support the compound multi-finger gesture within a computer-generated user interface.

2. The method of claim 1,
   wherein receiving the input temporally arranging the first graphical video clip comprises receiving input indicative of a resizing of the first graphical video clip representation within the timeline to change the temporal constraint of the first multi-finger gesture with respect to the timeline, and
   wherein generating the module further comprises generating the module in accordance with the changed temporal constraint for the first multi-finger gesture.

3. The method of claim 1, further comprising:
   wherein receiving declaration data comprises receiving input indicative of a shifting of the first graphical video clip representation within the timeline to change a temporal constraint associated with a starting time or an ending time for the first multi-finger gesture with respect to the timeline, and
   wherein generating the module comprises generating the module in accordance with the changed starting time and ending time for the first multi-finger gesture along the timeline.

4. The method of claim 1,
   wherein receiving declaration data comprises receiving input specifying one or more software callback functions associated with the first graphical video clip representation at respective points in time along the timeline; and
   wherein generating the module comprises generating the module to invoke the software callback functions at the respective points in time upon detection of the compound multi-finger gesture.

5. The method of claim 4, further comprising:
   receiving, by the processor executing in a test mode, demonstration data representative of a second demonstration of the first or second multi-finger gesture; and
   outputting, with the processor, an indicator for each software callback function within the module invoked in response to the demonstration data representative of the second demonstration of the first or second multi-finger gesture.

6. The method of claim 1, further comprising outputting, by the processor, the first graphical video clip representation to include a horizontal indicator along the timeline for each finger involved in the first multi-finger gesture.

7. The method of claim 1, wherein the first graphical video clip representation includes indicators that divide the first graphical video clip representation into a plurality of segments along the timeline, wherein a transition between the segments corresponds to a change in a number of fingers involved at a corresponding point in time in the first multi-finger gesture.

8. The method of claim 1, wherein generating the module comprises
   computing, by the processor, a first state machine based on the first multi-finger gesture;
   computing, by the processor, a second state machine based on the second multi-finger gesture;
   computing, by the processor, a third state machine for the compound multi-finger gesture by merging the first state machine with the second state machine; and generating the module in accordance with the third state machine.

9. The method of claim 8, wherein merging the first state machine and the second state machine comprises, in response to determining, by the processor, that the first graphical video clip representation of the first multi-finger gesture and the second graphical video clip representation of the second multi-finger gesture are positioned within a same track of the timeline, linearly connecting the first state machine and the second state machine to form the third state machine.

10. The method of claim 8, wherein merging the first state machine and the second state machine comprises:
in response to determining, by the processor, that the first graphical video clip representation of the first multi-finger gesture and the second graphical video clip representation of the second multi-finger gesture are positioned within different tracks of the timeline, computing the third state machine as a set of states and transitions that are a product of states of the first state machine with states of the second state machine; and
removing any of the states of the third state machine that violate any temporal constraints specified for the first multi-finger gesture and the second multi-finger gesture within the timeline.

11. The method of claim 1, wherein generating the module comprises:
computing, from the demonstration data and the declaration data, an inference model as a probabilistic finite state machine having a plurality of states and a set of probabilistic transitions between the states that are triggered by one or more events, wherein each of the states represents a current state of a plurality of fingers in the compound multi-finger gesture and the events represent a motion associated with one or more fingers; and
generating the module to be operable in accordance with the inference model.

12. The method of claim 11, wherein computing an inference module comprises computing probabilistic distribution of possible states in the state machine for each event within the demonstration data for the compound multi-finger gesture.

13. The method of claim 1, wherein the module comprises software source code.

14. A computing device comprising:
a processor; and
an authoring tool executing on the processor,
wherein the processor is operable to:
receive first demonstration data representative of at least one demonstration of a first multi-finger gesture, second demonstration data representative of at least one demonstration of a second multi-finger gesture, and declaration data specifying one or more constraints for one or more of the first multi-finger gesture or the second multi-finger gesture;
output, for display at a display device operatively coupled to the processor, a first graphical video clip representation of a first multi-finger gesture along a timeline and a second graphical video clip representation of a second multi-finger gesture along the timeline;
receive input temporally arranging the first graphical video clip and the second graphical video clip along the timeline of the user interface to form a compound multi-finger gesture; and
generate, in accordance with the first and second demonstration data, the declaration data, and temporal constraints defined by the temporal arrangement of the first graphical video clip and the second graphical video clip within the timeline of the user interface, a module to support the compound multi-finger gesture within a computer-generated user interface.

15. The computing device of claim 14, wherein the processor is operable to receive the the input temporally arranging the first graphical video clip as input indicative of a resizing or shifting of the first graphical video clip representation within the timeline to specify a temporal constraint associated with a starting time or an ending time for first the multi-finger gesture.

16. The computing device of claim 14,
wherein the processor is operable to receive input specifying one or more software callback functions associated with the graphical video clip representation at respective points in time along the timeline, and
wherein the processor is operable to generate the module to invoke the software callback functions at the respective points in time upon detection of the compound multi-finger gesture.

17. A non-transitory computer-readable storage medium comprising instructions that, when executed, cause one or more processors of a computing device to:
receive first demonstration data representative of a demonstration of a first multi-finger gesture;
receive second demonstration data representative of at least one demonstration of a second multi-finger gesture;
receive declaration data specifying one or more constraints associated with one or more of the first multi-finger gesture or the second multi-finger gesture;
output, for display, a first graphical video clip representation of the first multi-finger gesture along a timeline;
output, for display, a second graphical video clip representation of the second multi-finger gesture along the timeline;
receive input temporally arranging the first graphical video clip and the second graphical video clip along the timeline to form a compound multi-finger gesture that includes the first multi-finger gesture and the second multi-finger gesture; and
generate, in accordance with the first and second demonstration data, the declaration data and temporal constraints defined by the temporal arrangement of the first graphical video clip and the second graphical video clip within the timeline of the user interface, a module to support the compound multi-finger gesture within a computer-generated user interface.

18. The non-transitory computer-readable storage medium of claim 17,
wherein the input temporally arranging the first graphical video clip comprises a input indicative of a change to the temporal constraint for the first multi-finger gesture with respect to the timeline, and
wherein the instructions cause the one or more processors to generate the module in accordance with the changed temporal constraint for the first multi-finger gesture.

19. The non-transitory computer-readable storage medium of claim 17, wherein the instructions cause the one or more processors to:
receive the declaration data as input indicative of a resizing or shifting of the graphical video clip representation within the timeline to specify a temporal constraint associated with a starting time or an ending time for the first multi-finger gesture; and generate the module in accordance with the changed starting time and ending time for the first multi-finger gesture along the timeline.

\* \* \* \* \*